Figure 1:
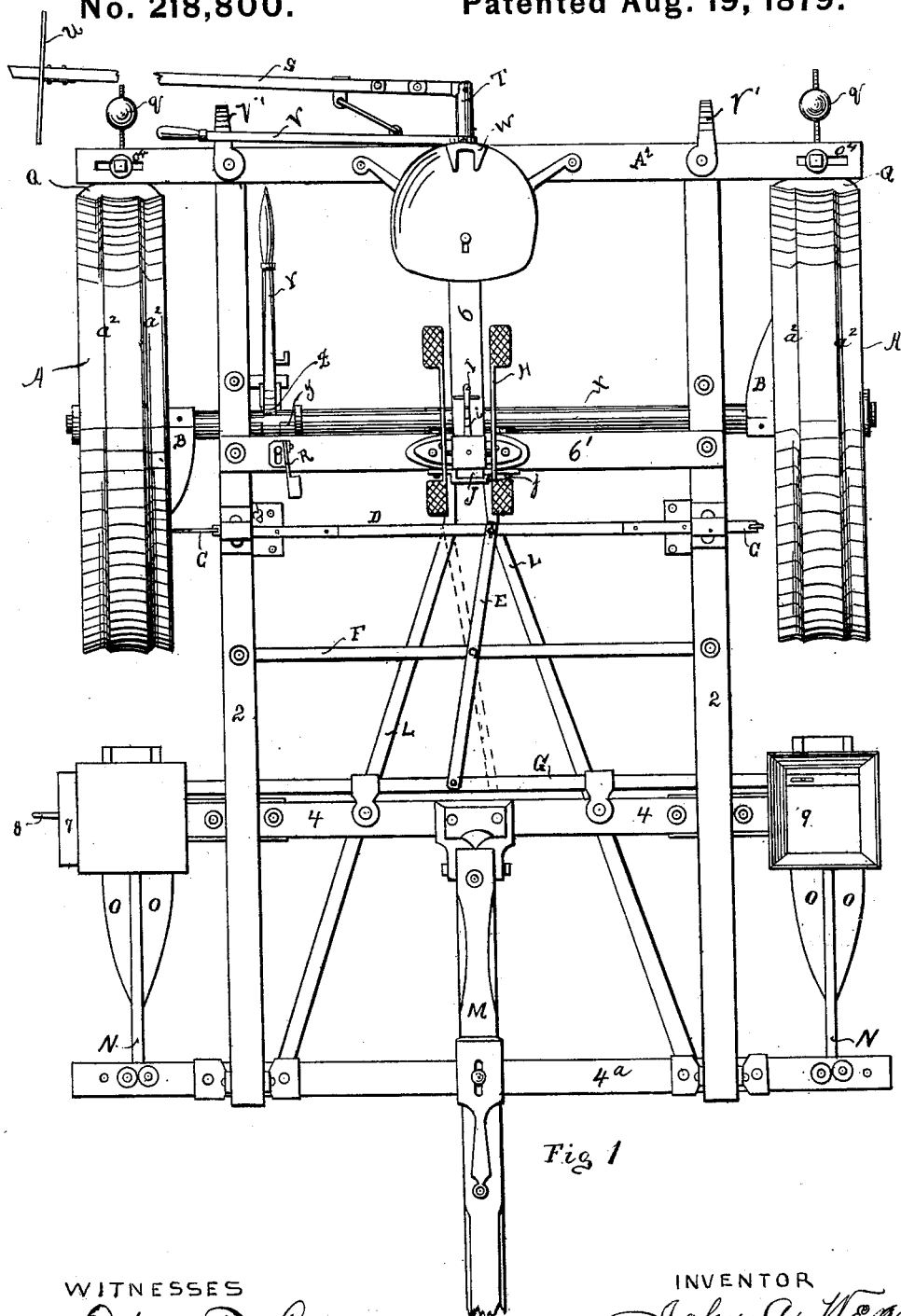

J. A. WERNER.
Corn-Planter.

No. 218,800. Patented Aug. 19, 1879.

WITNESSES
INVENTOR
John A. Werner
BY Ellis Spear
ATTORNEY

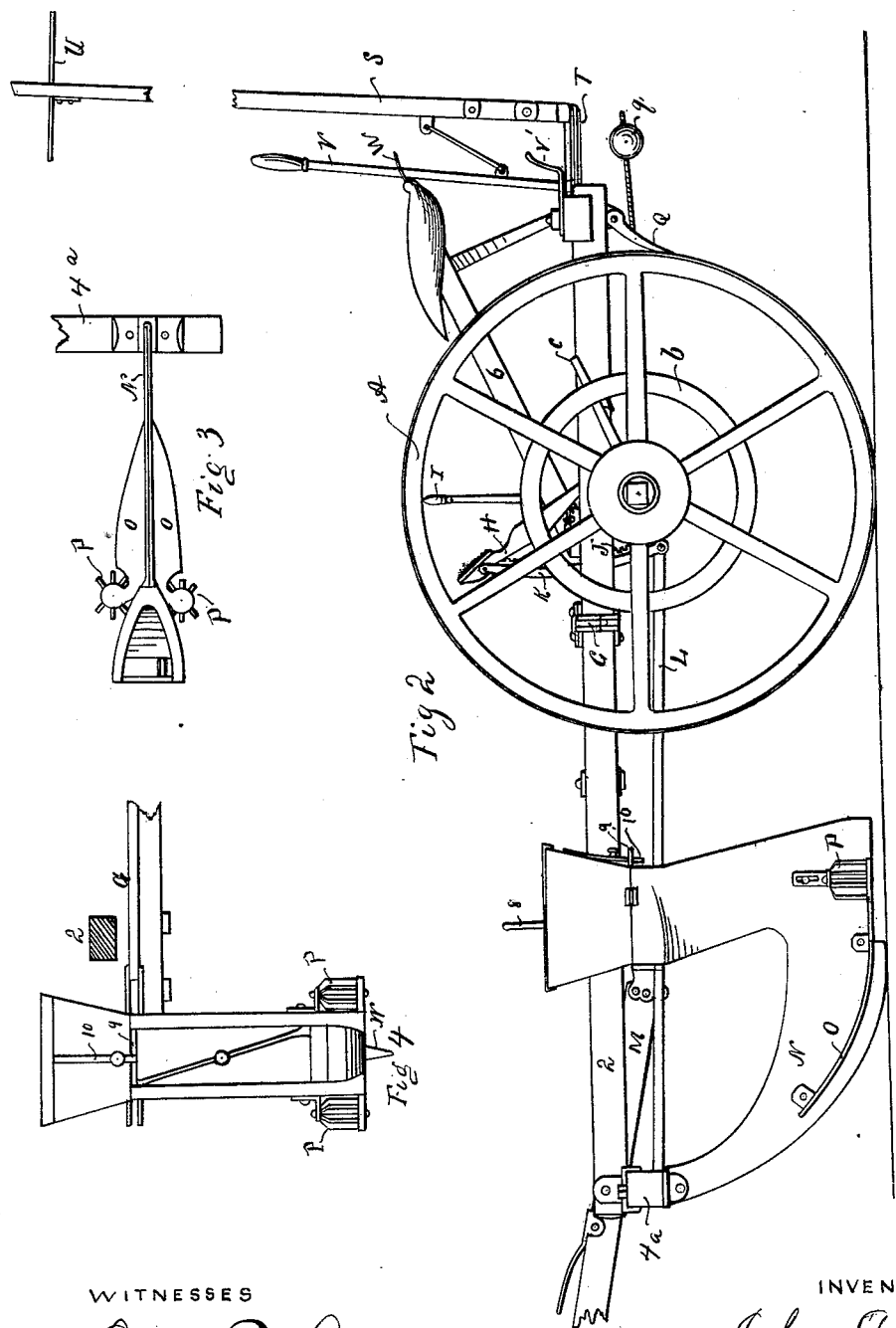

3 Sheets—Sheet 3.
J. A. WERNER.
Corn-Planter.
No. 218,800. Patented Aug. 19, 1879.
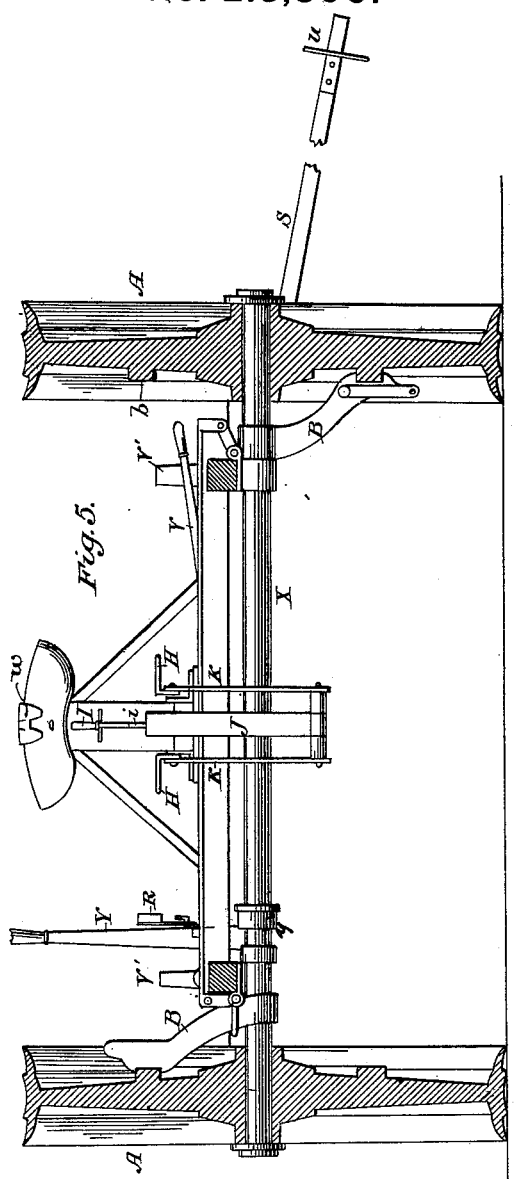
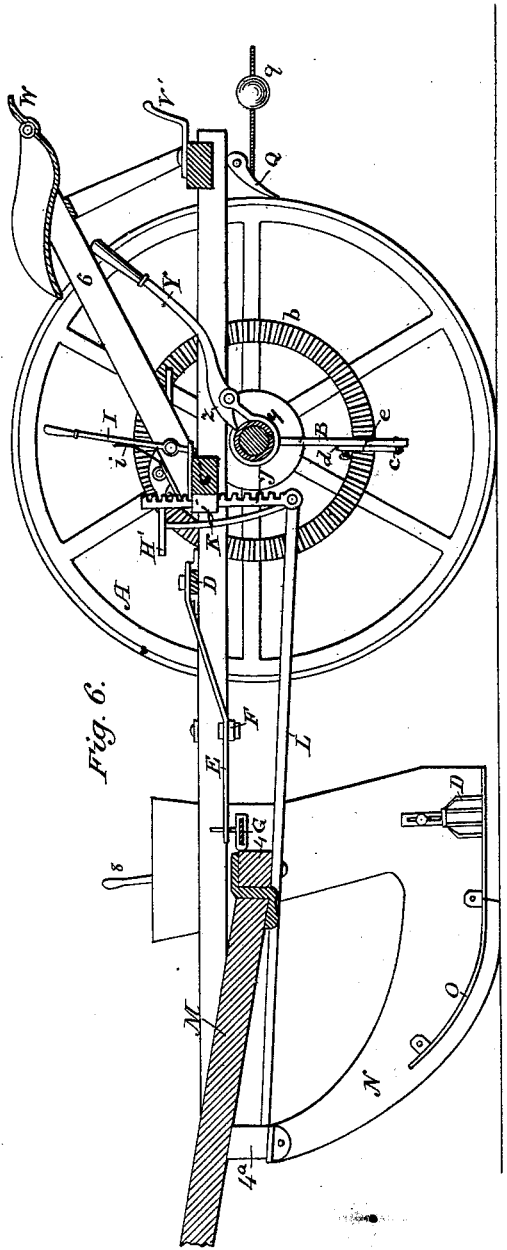
WITNESSES
Warren Seely
Frank Middleton
INVENTOR
John A. Werner
BY Ellis Spear
ATTORNEY.

UNITED STATES PATENT OFFICE.

JOHN A. WERNER, OF MEDIAPOLIS, IOWA, ASSIGNOR OF ONE-HALF HIS RIGHT TO CHARLES L. BROWN.

IMPROVEMENT IN CORN-PLANTERS.

Specification forming part of Letters Patent No. 218,800, dated August 19, 1879; application filed March 28, 1879.

*To all whom it may concern:*

Be it known that I, JOHN A. WERNER, of Mediapolis, county of Des Moines, State of Iowa, have invented an Improvement in Corn-Planters, of which the following is a specification.

My invention relates to self-dropping horse-power corn-planters; and consists of certain improved details of construction, whereby the apparatus is made more simple and effective.

The special features which constitute my invention are hereinafter fully described, and specifically pointed out in the claims.

In the drawings hereunto attached and forming part of this specification, Figure 1 is a plan view. Fig. 2 is a side elevation. Fig. 3 is a detached view of the runners and their attachments. Fig. 4 is a detached view of the rear of the seed-box and standard. Fig. 5 is a section through the wheels and axle, showing the knocking devices for operating the dropping mechanism; and Fig. 6 is a central vertical section from front to rear.

My improved corn-planting apparatus is supported upon wheels A A, which are formed concave upon their periphery, and with sharp peripheral ribs $a^2$, as clearly shown in the drawings. The size of the wheel should be so regulated that the circumference should equal the distance between the hills of corn, or some multiple of that distance. These wheels support the frame-work, shown with sufficient clearness in Fig. 1.

A strong cross-piece, 4, is arranged underneath the longitudinal beams 2 2, and extends beyond them on each side, forming support for the seed-boxes and runners. Another transverse piece, $4^a$, is secured to the forward ends of the longitudinal beams 2 2 by clips, or in any suitable way which permits the said transverse piece to turn slightly upon the longitudinal sills. To this transverse piece is bolted the pole M, which extends back to the transverse piece 4, to which it is connected by bolts passing through its end and through clips attached to the piece $4^a$. These clips are provided with several holes arranged vertically in relation to each other, and allow vertical adjustment of the pole. The runners N are rigidly attached to the bar $4^a$, so that the runners, with the bar 4, to which they are also attached, may be moved in relation to the main frame upon the pivotal connection between the transverse bar $4^a$ and the sills 2 2.

Running back from the transverse bar $4^a$ are two inclined arms, L L, which are let into the bar 4, and rigidly connected therewith. They extend back to a point a little in front of the axle, where they nearly meet. They are connected to each other and to a vertical ratchet-bar, J, by a transverse bolt. This bar J passes up through a guide, $j$, in which it is held adjustable by a sliding pawl, which is operated by a lever, I, said lever being pressed backward by a spring, $i$, so as to hold the pawl in connection with the bar J, but at the same time permitting the lever I to be pressed forward whenever it is desirable to release the bar J.

On a cross-bar, 6', are pivoted two treadle-levers, H H, having a flat serrated surface for the feet both at the front and rear ends. The forward ends of these levers are connected by pitmen K K to the rear end of the bars L, so that the bars L may be depressed or elevated by the feet of the driver, thus depressing or elevating the runners, and thereby regulating the depth of the planting.

The runners are formed in the manner clearly shown in the drawings, and directly over the top of the vertical part are mounted the seed-boxes, and the passages for the seed are formed in the rear. The runners are formed with the lower edge made sharp, and provided with sharp sandals O O, removably attached to each side of the runner, so that they can be removed for sharpening. The sharp edge of the runner serves to cut any sods or clods which they may encounter, and the sharp sandals O shave off the top of such clods, thereby serving to clear the way of the wheel by the removal of obstructions over which it would otherwise be compelled to pass. This is also further accomplished by grooved wheels P P, which revolve on vertical axles, and tend to throw obstructions to one side or the other. This removal of obstructions, such as clods or sods, from the way of the wheel is desirable, as otherwise the wheels would not accurately measure the distance between the hills.

The boxes are formed in the usual manner, and the valves within the boxes are operated by an ordinary dropping-slide, G. This slide is moved by a lever, E, pivoted upon the bar F, and connected by a pivot to the sliding bar D, which moves in guides on the longitudinal sills 2 2. At each end this bar D is connected to a bell-crank lever, C, pivoted at its lower corner to the side of the sill, and having its horizontal arm slightly bent downward and extending out to within reach of the knockers B. These knockers are fixed upon the axle just inside of the wheels, and are inclined outward, so as to come in contact with a circular rack-bar, b, fixed upon the inside of the wheel A. The knockers may be connected at any point by a sliding pawl, c, which is moved in and out by a lever, d, to which it is attached. A pin, e, holds it in any required position, either in or out of gear with the ratchet of the wheel. When they are out of gear the wheels may revolve without moving the dropping mechanism; but when they are in gear the forward revolution of the wheels brings the knockers into contact with the outward-projecting arm of the bell-crank lever, and thereby imparts an endwise movement to the bar D, operating the seed-valves.

I have shown these knockers two in number, and set opposite each other, so that the seed is dropped upon each side at every revolution of the wheels, but alternately, and with the hill in one row opposite the open space in the adjacent row.

Obviously the number of the knockers may be increased to any desired extent, so as to drop oftener, if desired.

On the right-hand side of the driver's seat is placed a griping-lever, Y. It is held to the axle by a clasp, y, in the head of which it is pivoted in the manner shown.

The lever may be moved backward freely; but when pressed forward the point Z will be pressed upon the surface of the axle in the manner of a cam, and will serve to turn the axle, and thus bring the wheels into the proper position for starting at the beginning of a row. This lever Y is held in a vertical position by the pawl R. This will hold the axle firmly in place, and prevents the machinery from dropping when it is moving upon the road, or in any other place where it is not desirable to drop the seed.

The wheels are formed in ordinary shape for covering the seed after it has been dropped.

The plates $a^2$, to which the bell-crank levers are attached, are adjustable outward, and the bar D is also extensible, in order to adjust the apparatus to different width of tread of the wheel.

Directly in rear of the wheels, and suspended to the rear transverse bar, $A^2$, of the frame, are scrapers Q Q, pivoted upon a bolt, which is adjustable laterally on the bar in the slot $o^4$.

A weight, q, is suspended on a threaded rod, which extends to the rear, so that the weight may be adjustable upon the said rod, and the pressure of it upon the scraper varied at will. These scrapers are essential to keep the surface of the wheels free from any earth which might adhere to them, which would practically increase the size of the wheel and render the operation of the dropping irregular.

In rear of the central part of the machinery is pivoted, on a swivel-bolt, a marking-pole, S. It is connected by a link to a lever, V, which lever rests in supports V′ V′, arranged at a proper point to allow the marker to come properly in contact with the ground, and to prevent the lever from falling to the ground.

The hinged marking-pole S is provided with an adjustable shoe, U, symmetrically formed, so as to operate in the same way, whether the pole be thrown to one side or the other. It is made adjustable on the pole to adapt it to different widths of the tread of the planter.

The lever V is locked in a vertical position to the rear of the seat by a hinged hasp, W, for the purpose of holding the marker perpendicular when going to and from the field or passing through gates.

On the outside of the seed-box I have shown a supplemental seed-box (marked 7) for pumpkin-seed, with a lever, 8, operating a sliding valve, to be used whenever it is desirable to stop the flow of seed.

The plate in the bottom of the seed-boxes (marked 9) is made round, and has different-sized holes, according to the number of grains required to pass at one time. It may be turned to bring any one of these holes into proper position, and is held by a spring, 10, which presses against the outer edge of it.

The machinery may be used to drop corn or other seed, as may be desired.

What I claim as my invention, and desire to secure by Letters Patent, is—

1. The cross-bar $4^a$, pivoted to the forward ends of the sills 2 2, and runners N, rigidly attached to said cross-bar, in combination with the bars L, provided with vertical rack-bar J, treadles H H, pitmen K K, spring-lever I, carrying a sliding pawl, and tongue M, pivotally attached at its rear end to the main frame, substantially as described, and for the purpose set forth.

2. The combination, with the loose wheel A, provided with the circular gear b, of the knocker B, attached to the axle, sliding pawl c, lever d, and pin e, substantially as described, and for the purpose set forth.

3. The knocker B, attached to the axle, and clasp y, embracing the latter, in combination with the griping-lever Y, pivoted to the clasp, and having the projecting cam Z and the pawl R, for retaining the griping-lever in an upright position, substantially as described, and for the purpose set forth.

4. The combination of the runner N, having a sharp edge, with the removable sandals O, having an exterior cutting-edge, substantially as described, and for the purpose set forth.

5. The wheel A, having a concave tread, with sharp peripheral ribs $a^2$, as shown and described.

6. The combination, with the runner N, having removable sandals O O, of the wheels P, journaled in the sides of the runners, substantially as described, and for the purpose set forth.

7. The combination, with the wheel A, having a concave tread and peripheral ribs, as described, of the notched hinged scraper Q, laterally adjustable in the slots $o^4$, and weight $q$, adjustable on a screw-threaded bolt attached to the scraper, substantially as described, and for the purpose set forth.

8. The marking-pole S, swiveled upon the rear beam, in combination with the rear supports, V', and lever V, connected by a link with the marking-pole, substantially as described.

In testimony whereof I have signed my name to this specification in the presence of two subscribing witnesses.

JOHN A. WERNER.

Witnesses:
 JOSEPH D. HOBBS,
 WM. HARPER.